Aug. 26, 1941.  M. VON ARDENNE  2,253,542
ELECTRON SCANNING MICROSCOPE
Filed May 31, 1939
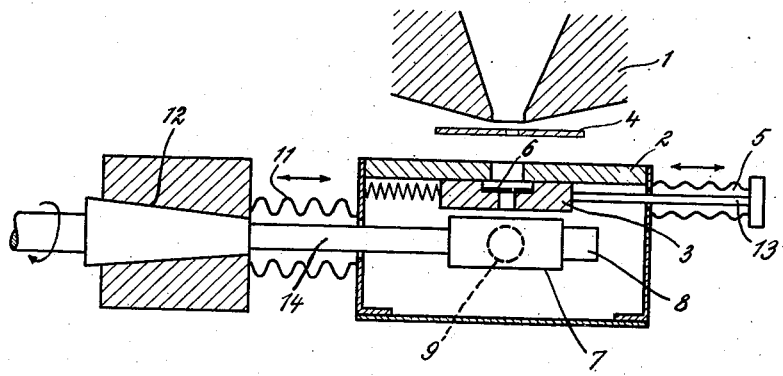
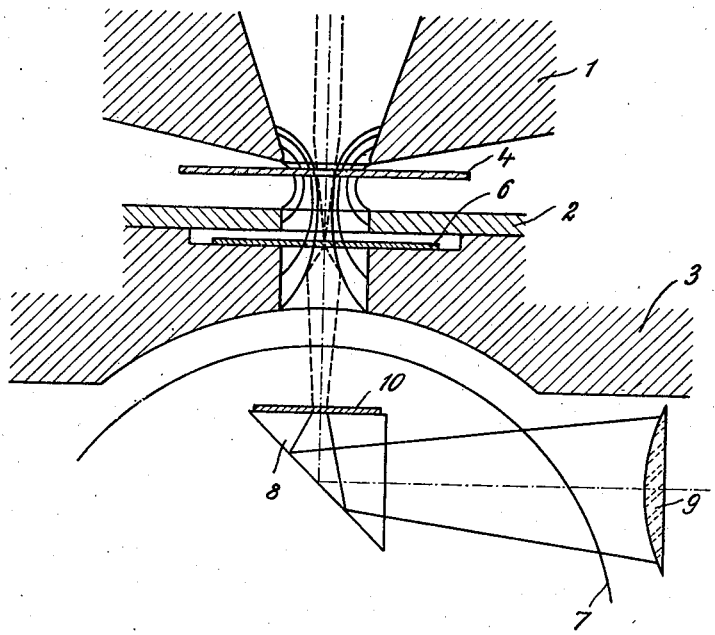
Inventor.
Manfred von Ardenne
by Knight Bros
attorneys Patented Aug. 26, 1941

2,253,542

UNITED STATES PATENT OFFICE 2,253,542

ELECTRON SCANNING MICROSCOPE

Manfred von Ardenne, Berlin-Lichterfelde, Germany

Application May 31, 1939, Serial No. 276,600
In Germany June 1, 1938

7 Claims. (Cl. 250—141)

This invention relates to a method and means for photographically recording electron-optical images in electron scanning microscopes. Such microscopes comprise means for scanning an object, usually in the form of a thin layer or foil, with an electron-optically focussed beam of electron rays which when passing through the object is modified or modulated in accordance with the structure of the object at the particular point of incidence. Simultaneously, a recording surface arranged behind the object is caused to effect a movement synchronous with the scanning operation but of considerably greater amplitude, so that the record, produce point for point and line for line by the modulated beam, represents a magnified electron-optical image of the object.

In a microscope of the above-mentioned type, the greatest possible resolving power is attained if the plane of the smallest cross-section of the beam of electron rays scanning the object coincides with the plane of the object. Before using the scanning microscope, it is therefore necessary, in order to attain optimum conditions as to the sharpness of the image, to adjust the instrument in such a manner that the focal point of the electron beam lies in the plane of incidence at the object. Such focussing may be obtained by first taking a number of pictures with different anode voltages or with different currents flowing in the magnetic lens system of the microscope. After these pictures have been developed, they present images of different sharpness and thus convey an idea as to the voltage and current values which must be adjusted and maintained to obtain satisfactory results. This method may be simplified by changing the focal length of the objective not from picture to picture but from line to line by a predetermined amount that can always be reproduced. These focussing methods are complicated and time-consuming. On the other hand, the focussing can hardly be dispensed with, in particular in photographically recording scanning microscopes.

The present invention is based on another focussing method which, in principle, comprises the temporary replacing of the recording surface proper by a luminescent screen and the checking of the focussing by observing the visual image produced on the screen while adjusting the scanning microscope. Tests have shown that also very small currents, in the case of a sharpness of the electron ray varying from $10^{-5}$ to $10^{-6}$, are sufficient to produce on a fluorescent screen a luminous spot which is distinctly visible by means of a simple light-optical miscroscope. If an object having a sharp edge is placed on the foil scanned by the electron beam, the sharpness of the electron beam may be judged from the brightness of the luminous spot when the beam passes over this edge. Even an accurate measurement of the diameter of the electron beam in the plane of incidence is possible after the deflecting device (for instance, a system consisting of a slide wire testing bridge and deflecting coils) has been calibrated. When adjusting the electron microscope in the above manner, the focussing may be effected in a surprisingly rapid and accurate way.

It is self-evident that not only the focussing proper of the microscope but also the maintenance of the current and voltage at constant values play an important part. It has already been proposed to control the focussing by an arrangement in which an auxiliary electron ray tube of a particular type is connected across the anode voltage terminals of the electron miscroscope. In this electron ray tube, the ray is deflected one or more times by magnetic fields; and the displacements of the fluorescent spot occurring therein due to the variations of the anode voltage and of the energizing current of the electromagnetic objective lens serve to control the values of the current and voltage. However, when using this device, it is very seldom possible to effect the focussing proper of the microscope in an exact manner according to the method described above. The replacing of the auxiliary device or its fluorescent screen by the recording device of the microscope, after the microscope has been focussed, requires a new evacuation of the microscope, which is not only time-consuming but also apt to affect the position of the object owing to changes in pressure or to thermal influences. Consequently, when the microscope is ready to be operated, the condition for an optimum focussing is not fulfilled; i. e. the plane in which the object lies does not coincide with the plane of the smallest cross-section of the electron ray even if the auxiliary device was accurately adjusted.

An object of the present invention is to provide an electron scanning microscope with focussing means which are free of the above-mentioned drawbacks. Another object, more in particular, is to effect the focussing by means of a visual luminous spot, or the like, with a high accuracy and without requiring a repeated evacuation of the microscope or other time-consuming operations. Other objects of the invention will become apparent from the following description.

According to the invention, a rotatable and longitudinally displaceable recording drum and a light-optical prism are arranged in the vacuum chamber of an electron scanning microscope so as to be exchangeable for each other. The surface of the prism facing the object is coated with a fluorescent substance, and a light-optical microscope may be provided to observe through the prism the luminous effect produced on this coating when the prism is in proper position and met by the electron beam. In this position, the luminous image is focussed for optimum sharpness. Then the recording drum, provided with photosensitive paper, is substituted for the prism and is set in motion in a known manner after the devices serving to measure the electrical magnitudes of the microscope and to maintain them at a constant value have been put into operation. In this case the dimensions of the recording drum are made preferably small from the standpoint of intensity and structure of image. The size of the image recorded may be similar to that of a postage stamp, and a small light-optical microscope may be used for examining it. By giving the recording drum such small dimensions, a perfect vacuum may be obtained with relatively simple means.

According to another feature of the invention, the drive means for operating the rotary and axially shiftable recording drum are arranged outside of the vacuum chamber of the microscope, and the driving shaft of the recording drum extends outwardly through a corrugated tombac tube and a sealing plug in such a manner that the vacuum chamber of the microscope is hermetically sealed against the outside atmosphere. In this case, the arrangement is so designed that upon each rotation of the drum the sealing plug is moved in the direction of the drum axis by an amount equal to the distance between the recording lines.

Further details of the invention will be apparent from the following description taken in connection with the accompanying drawings in which Figs. 1 and 2 are sectional views, perpendicular to each other, of a part of the optical system and the recording device of a scanning microscope according to the invention. In both figures, 1 denotes the upper pole piece of a magnetic electron-optical lens system; the second pole piece consists of a fixed part 2 and a movable part 3. Between the pole pieces is arranged an aperture diaphragm 4. The position of the movable part 3 with respect to the optical axis may be changed from outside. To this end, the part 3 is secured to a control rod 13 which extends through a tombac tube 5. The pole piece part 3 serves at the same time to support the object or object foil 6. The character of the magnetic lens field between the pole pieces is apparent from the lines of force indicated in Fig. 2. The field produced in the air gap above the object 6 causes the electron rays which diverge after having passed through the object to converge again. This multiple focussing is attained by the fact that a number of magnetic lines of force reach the movable pole piece part 3 owing to the saturation of the stationary part 2 of the pole piece. A recording drum 7 is arranged immediately beneath part 3. It is preferable to position the recording drum as close as possible to the bore of the pole piece. To this end, the part 3 has a recess shaped according to the curvature of the recording drum (Fig. 2). A prism 8 whose surface facing the objective system is provided with a coating 10 of a fluorescent substance, arranged at one end of the recording drum. A light-optical lens forming part of a light microscope is arranged in the wall of the vacuum vessel 15 (Fig. 1) of the electron microscope. A revolvable and axially displaceable shaft 14 carrying the drum 7 extends through a corrugated expansible tombac tube 11 and is provided with a sealing cone 12. The shaft 14 can be rotated and axially shifted from the outside. In the position shown in Fig. 1, the drum 7 is in operative condition. By sufficiently shifting the shaft 14, the prism 8 may be placed into the optical axis where its coating 10 is impinged upon by the modulated electron beam. This position is shown in Fig. 2.

If in the position shown in Fig. 2 the light phenomena in the fluorescent layer 10 of the prism 8 are observed throughout the microscope 9 when scanning a given sharp contour of the object, a particularly sudden change in brightness results upon the attainment of certain values of the anode voltage or of the current energizing the magnetic lens system, from which change it may be concluded that at this moment the smallest cross-section of the electron ray scanning the object coincides with the plane of the object. To increase the number of the changes in brightness to be observed on the fluorescent layer 10 when scanning the object, crystals having especially sharp edges may be mixed, according to the invention, with the substances to be tested. In some cases it is preferable to cover part of the object foil, preferably at the edge thereof, with a sharply contoured means, for instance, zinc crystals or a sharp metal foil edge lying in the plane of the object. If the scanning microscope is thus focussed, the electrical data may be kept constant with the aid of known devices during the period of the electron-optical recording. After the focussing, the recording drum 7 is operated in the known manner by setting it in rotation and advancing it in the longitudinal direction after each rotation by an amount proportional to the desired distance between the lines. The recording drum is covered with a photosensitive layer so that the modulated scanning beam records a magnified image of the object.

What is claimed is:

1. An electron scanning microrcope having a vacuum chamber, holding means in said chamber for accommodating an object to be investigated, means for scanning the object with a beam of electron rays, a recording device having a recording surface for accommodating a photosensitive layer, said recording device being arranged in said vacuum chamber behind said object so as to be impinged upon by said beam and movable in two directions corresponding to the scanning directions respectively of the beam, driving means connected with said recording device for moving said device synchronously with and proportionally to the operation of said scanning means and with an amplitude larger than that of the scanning movement of the beam in order to produce a magnified image of the object, a light-optical prism arranged in said vacuum chamber so as to be movable into the path of said beam in exchange for said recording device, said prism when in operative position having a surface facing the object covered with luminescent substance, and light-optical means for observing said substance through said prism.

2. An electron scanning microscope having a vacuum chamber, holding means in said chamber for accommodating an object to be investigated, means for scanning an object with an electron beam, a rotatable and axially shiftable recording drum arranged in said chamber behind the object so as to have its cylindrical surface impinged upon by the beam, driving means connected with said drum for rotating and shifting said drum simultaneously with and proportionally to the scanning movement of the beam yet with an amplitude larger than that of said scanning movement so as to produce a magnified image of the object, a light-optical prism connected with said drum so as to be moved into the path of said beam when axially shifting said drum, said prism when in operative position having a surface facing the object covered with luminescent substance, and light-optical means for observing said substance through said prism.

3. An electron microscope operating with an electron beam scanning the object to be reproduced, comprising a vacuum chamber, an electron-optical lens system for focussing the electron beam, said lens system containing pole pieces concentric to and spaced along the axis of the beam, a carrier for holding the object to be reproduced, said carrier being arranged in proximity to said lens system, a rotatable and axially shiftable recording drum arranged in said chamber close to said lens system and behind said object carrier so as to have its cylindrical drum surface impinged upon by the beam, driving means connected with said drum for rotating and shifting said drum simultaneously with and proportionally to the scanning movement of the beam yet with an amplitude larger than that of said scanning movement so as to produce a magnified image of the object, an auxiliary member having a fluorescent surface, said member being connected with said drum so as to have said surface placed into the path of the beam upon proper moving of said drum, and light-optical means for observing said fluorescent surface for focussing the electron beam.

4. An electron-optical microscope having a vacuum chamber, holding means in said chamber for accommodating an object to be investigated, means in said chamber for scanning the object with a beam of electron rays, a movable recording device for accommodating a photosensitive layer, said recording device being arranged in said vacuum chamber behind said object so as to be impinged upon by said beam, and driving means connected with said recording device for moving said device simultaneously with the operation of said scanning means and with an amplitude proportionally larger than that of the scanning movement of said beam in order to produce a magnified image of the object, said driving means comprising an actuating portion arranged outside of said vacuum chamber and mechanically connected with said drum through the wall of said chamber.

5. A electron-optical microscope having a vacuum chamber, holding means in said chamber for accommodating an object to be investigated, means in said chamber for scanning the object with a beam of electron rays, a movable recording device for accommodating a photosensitive layer, said recording device being arranged in said vacuum chamber behind said object so as to be impinged upon by said beam, and driving means connected with said recording device for moving said device simultaneously with the operation of said scanning means and with an amplitude larger than that of the scanning movement of said beam in order to produce a magnified image of the object, said driving means comprising a rotatable and axially shiftable shaft connected with said drum, a sealing cone associated with said shaft, an expansible corrugated tube forming a wall portion of said chamber, and a sealing body connected with said tube and having a conical bore receiving said sealing cone so as to allow said drum to be rotated and axially shifted from outside of said chamber.

6. An electron microscope operating with an electron beam scanning the object to be reproduced, comprising a vacuum chamber, an electron-optical lens system for focussing the electron beam, said lens system containing pole pieces concentric to and spaced along the axis of the beam, a magnetic carrier for the object to be reproduced, said carrier being associated with one of said pole pieces so as to form a coactive part of said lens system, a recording device having a recording surface for accommodating a photosensitive layer, said recording device being arranged in immediate proximity to one of said pole pieces, and driving means for actuating said recording device in two directions transversely to the beam and simultaneously with its scanning operation yet with an amplitude larger than that of the scanning movement of the beam in order to produce a magnified image of the object.

7. In an electron microscope substantially according to claim 6, said magnetic object carrier being movable and adjustable relative to said pole pieces of said lens system.

MANFRED VON ARDENNE.